Sept. 29, 1942.  E. GABLER ET AL  2,297,401
PHOTOGRAPHIC CAMERA
Filed Sept. 27, 1939
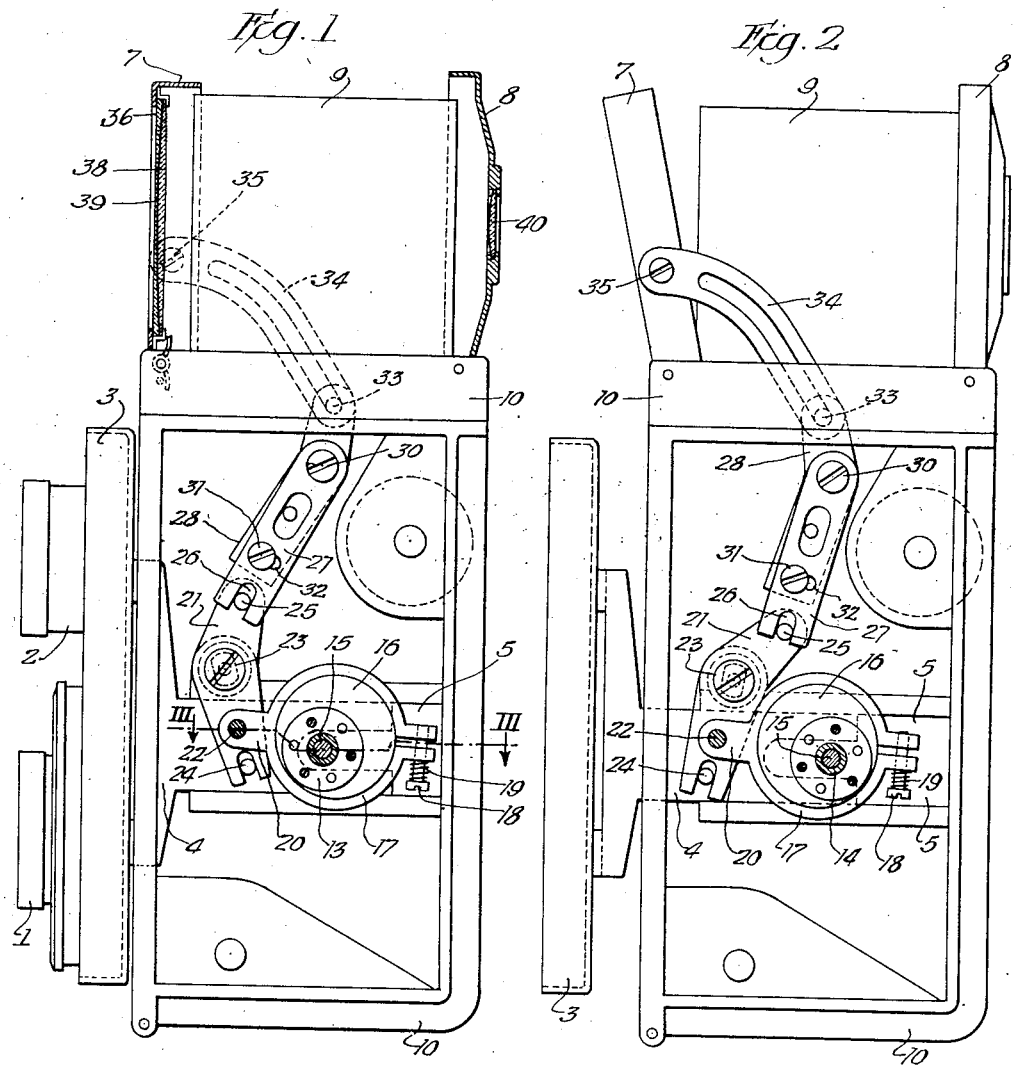
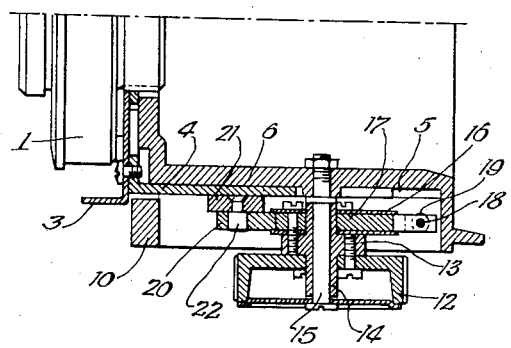
Inventors.
Ernst Gabler
Ernst Rall Patented Sept. 29, 1942

2,297,401

UNITED STATES PATENT OFFICE 2,297,401

PHOTOGRAPHIC CAMERA

Ernst Gabler and Ernst Rall, Stuttgart, Germany; vested in the Alien Property Custodian Application September 27, 1939, Serial No. 296,796
In Germany February 17, 1939

5 Claims. (Cl. 95—44)

The invention relates to improvements in photographic cameras and particularly is directed to a novel arrangement and adjustment of an eye level view finder on a rollfilm camera provided with a mirror reflex finder.

It is an object of the invention to combine an eye level view finder with the collapsible hood of the mirror reflex finder and to operatively connect the eye level view finder with the focusing means of the camera objective for adjusting the eye level view finder whenever the camera objective is adjusted for compensating any errors due to parallax.

Another object of the invention is to adjust the camera objective in axial direction by means of a pivoted lever actuated by a manually rotated eccentric and operatively connect the pivoted lever with a link mechanism which is adapted to adjust the eye level view finder in accordance with the adjustment of the camera objective.

Still another object of the invention is to provide an adjustable link mechanism between the camera objective adjusting lever and the adjustable eye level view finder for correcting any inaccuracies in the parallax compensation.

Another object of the invention resides in a particular construction of the eccentric which actuates the pivoted lever forming a part of the camera objective adjusting means and employed for actuating the eye level view finder adjusting means. The eccentric which is rotated by a manually operable knob about the axis of the latter is slidably embraced by an eccentric strap which is maintained in yielding engagement with the circumference of the eccentric, thus eliminating any back-lash or play. The eccentric strap has a radial projection which is pivotally connected with the aforesaid pivoted lever of the camera objective adjusting means.

Other objects of the invention will be apparent or will be specifically pointed out in the description forming a part of this specification, but the invention is not limited to the embodiment of the invention herein described, as various forms may be adopted within the scope of the claims.

In the drawing:

Figure 1 is a side view of a camera with the outer wall removed to illustrate the operative connection between the camera objective adjusting means and the eye level view finder, the latter being shown in section and the camera objective being adjusted to infinity;

Figure 2 is a similar view as Figure 1, except that the camera objective and eye level view finder are adjusted to an object very close to the camera, and Figure 3 is a partial sectional view of the camera substantially along the line III—III of Figure 1.

In the drawing is illustrated a rollfilm camera of the type in which a camera objective 1 and a mirror reflex finder objective 2 are mounted with their axes parallel and vertically spaced on a common objective board 3 provided with rearward extensions 4 slidably mounted in suitable guideways 5 on the side walls 6 of the camera casing 10. A collapsible hood comprising a front wall 7, a rear wall 8 and two side walls 9 is mounted on the top of the camera casing 10 and in its erected position, as shown in Figs. 1 and 2, permits an observation of the reflex finder image appearing on a translucent screen (not shown) which is mounted horizontally in the upper portion of the camera casing 10, preferably in the top wall thereof.

One of the side walls 6 of the camera casing 10 has rotatably mounted thereon an operating knob 12 for adjusting the objectives 1 and 2 by moving the objective board 3 to and from the camera casing. The knob 12 is fixedly secured to a flange 13 on a sleeve 14, which in turn is rotatable on a pin 15 fixedly mounted to the side wall 6. The sleeve 14 has also fixedly secured thereto an eccentric 16 which is slidably surrounded by an eccentric strap 17, the free ends of which are adjustably connected with each other by a screw 18 and spring 19. The connection 18, 19 insures a sliding fit of the strap 17 around the eccentric 16, and eliminates any clearance or play. Opposite the free ends of the strap 17 the latter is provided with an extension 20 which at 22 is pivotally connected with an arm of a lever 21 rotatably connected between its ends at 23 to the side wall 6 of the camera casing. The lower end of this arm of the lever 21 is slotted to embrace a pin 24 attached to the rearward extension 4 of the objective board or carrier 3. Upon rotation of the knob 12, which is provided with a distance scale (not shown), the eccentric 16 becomes effective to swing the lever 21 about its pivot 23, thus moving the objective board 3 to or away from the front of the camera. In this manner the camera objective 1 and therewith the reflex finder objective 2 may be focused upon objects positioned at any desired distance from the camera.

The upper arm of the lever 21 is provided with a pin 25 projecting into a slot 26 in the lower end of an adjusting link 27 secured to a double armed lever 28, which is rotatably supported between its ends at 30 to the wall 6 of the camera casing. The link 27 is secured in the desired position on the lever 28 by a screw 31 passing through a transverse slot 32 in the link 27. The upper arm of the lever 28 is pivotally connected at 33 with the lower end of one of two braces 34, the upper ends of which are pivoted at 35 to the hinged front wall 7 of the hood. The braces 34 are slotted throughout the major portion of their length, so as to permit a folding of the hinged front wall 7 upon the top wall of the camera.

In the present embodiment the eye level view finder comprises a negative lens member 36 cemented to a positive lens member 38 between which is provided a semi-transparent silvered face 39. This finder lens 36, 38, 39 is mounted in an aperture of the hinged front wall 7 of the hood, and an ocular lens 40 is mounted in the center of the hinged rear wall 8 of the hood, as is clearly illustrated in Fig. 1. The eye level view finder is of well known construction and therefore it suffices to say that the reflective property of its silvered surface is such that a mark arranged at a predetermined distance away from this surface is reproduced in infinity by means of the refractive power of the associated lens faces.

It will be apparent from the Figs. 1 and 2, that during a rotation of knob 12 not only the camera objective 1 and the objective 2 of the mirror reflex finder are adjusted, but simultaneously therewith the lens 36, 38, 39 of the eye level view finder by means of the described operative connection 25, 27, 28, 34. This connection is readily adjustable owing to the incorporation of the adjusting link 27, so that any inaccuracy in the parallax compensation may be corrected. It is merely necessary to loosen the screw 31 and shift the link 27 relatively to the lever 28 the required direction and then tighten the screw 31 again. In Fig. 2 the camera objective 1 is focused upon an object which is positioned very close to the camera. In such a case the objective board 3 will be in an extended position and the eye level view finder lens 36, 38, 39 will assume a forwardly inclined position so as to indicate properly the picture field which will be photographed by the camera objective 1 on the film.

What we claim is:

1. In a photographic camera, the combination of a camera casing, of a mirror reflex finder provided with a collapsible hood and an eye level view finder, a camera objective, a support for said camera objective slidably supported on the side walls of said camera casing so as to be movable to and from the front wall of the same, manually operable means on said camera casing for slidably adjusting said support to thereby focus said camera objective, said hood including a front wall and a rear wall, both of which are hingedly secured to the camera casing, said front and rear walls of the hood being each provided with means forming together said eye level view finder adapted to be used when said hood is in its operative erected position, and means operatively connecting said manually operable means with the front wall of said hood for swinging said front wall in its hinged mounting and thereby adjust said eye level view finder simultaneously with the camera objective, said manually operable means including an eccentric rotatably mounted about a fixed axis on a side wall of the camera casing and a lever actuated by said eccentric, said lever being rotatably supported between its ends and one of its ends being operatively connected with said slidable camera objective support, while the other end of said lever is operatively connected with a second lever controlling the adjustment of the front wall of said hood.

2. A photographic camera as set forth in claim 1, in which said eccentric is embraced slidably by a strap having an outwardly extending arm which is pivotally connected with said first mentioned lever which is operatively connected with said objective support and said second lever.

3. A photographic camera as set forth in claim 1, in which said eccentric is embraced slidably by a strap having an outwardly extending arm which is pivotally connected with said first mentioned lever which is operatively connected with said objective support and said second lever, said strap being open at one point and the two ends thereof being adjustably and yieldably connected with each other by a screw and a spring.

4. In a photographic camera, the combination of a camera casing, of a mirror reflex finder provided with a collapsible hood and an eye level view finder, a camera objective, a support for said camera objective slidably supported on the side walls of said camera casing so as to be movable to and from the front wall of the same, manually operable means on said camera casing for slidably adjusting said support to thereby focus said camera objective, said hood including a front wall and a rear wall, both of which are hingedly secured to the camera casing, said front and rear walls of the hood being each provided with means forming together said eye level view finder adapted to be used when said hood is in its operative erected position, and means operatively connecting said manually operable means with the front wall of said hood for swinging said front wall in its hinged mounting and thereby adjust said eye level view finder simultaneously with the camera objective, said manually operable means including an eccentric rotatably mounted about a fixed axis on a side wall of the camera casing and a lever actuated by said eccentric, said lever being rotatably supported between its ends and one of its ends being operatively connected with said slidable camera objective support, while the other end of said lever is operatively connected with a second lever controlling the adjustment of the front wall of said hood, and adjustable means connected with said second lever for varying its relative position with respect to said first mentioned lever, whereby any inaccuracy in the adjustment of the eye level view finder with respect to parallax compensation can be eliminated.

5. In a photographic camera, the combination with a camera casing, of a mirror reflex finder provided with a collapsible hood and an eye level view finder, a camera objective, a support for said camera objective slidably supported on the side walls of said camera casing so as to be movable to and from the front wall of the same, manually operable means on said camera casing for slidably adjusting said support to thereby focus said camera objective, said hood including a front wall and a rear wall, both of which are hingedly secured to the camera casing, said front and rear walls of the hood being each provided with means forming together said eye level view finder adapted to be used when said hood is in its operative erected position, and means operatively connecting said manually operable means with the front wall of said hood for swinging said front wall in its hinged mounting and thereby adjust said eye level view finder simultaneously with the camera objective, said manually operable means including a manually rotatable knob rotatable about a fixed axis on a side wall of the camera casing, an eccentric fixedly attached to said knob, an eccentric strap slidably embracing said eccentric, and a lever pivotally connected with said eccentric strap, said lever being rotatably supported between its ends and one of its ends being operatively connected with said slidable camera objective support, while the other end of said lever is operatively connected with a second lever controlling the adjustment of the front wall of said hood.

ERNST GABLER.
ERNST RALL.